United States Patent [19]

Blount

[11] Patent Number: 4,737,575

[45] Date of Patent: Apr. 12, 1988

[54] PROCESS FOR THE PRODUCTION OF EPOXY SILICATE PRODUCTS

[76] Inventor: David H. Blount, 6728 Del Cerro Blvd., San Diego, Calif. 92120

[21] Appl. No.: 57,401

[22] Filed: Apr. 30, 1987

[51] Int. Cl.$^4$ .................. C08G 77/02; C08G 77/04
[52] U.S. Cl. .................. 528/405; 521/154; 524/791; 528/409
[58] Field of Search ............... 528/405, 409; 521/154, 521/791; 524/791

[56] References Cited

U.S. PATENT DOCUMENTS

| 4,036,787 | 7/1977 | Blount | 106/287.16 |
| 4,086,190 | 4/1978 | Blount | 528/31 |
| 4,087,407 | 5/1978 | Blount | 544/190 |
| 4,089,840 | 5/1978 | Blount | 528/405 |
| 4,129,528 | 12/1978 | Petrovich et al. | 528/405 |
| 4,235,767 | 11/1980 | Blount | 528/405 |
| 4,331,554 | 5/1982 | Quinlan | 528/405 |

*Primary Examiner*—Morton Foelak

[57] ABSTRACT

Epihalohydrin compounds will react chemically with alkali oxidated silicon compounds in the presence of a peroxide to produce a self-standing cellular or solid epoxy silicate product which may be utilized for thermal and sound insulation, as a cavity filler and as a coating agent.

17 Claims, No Drawings

PROCESS FOR THE PRODUCTION OF EPOXY SILICATE PRODUCTS

BACKGROUND OF THE INVENTION

This invention relates to the production of epoxy silicate solid and foam products by the chemical reaction of an alkali oxidated silicon compound and an epihalohydrin compound and a peroxide compound. The product produced by this invention will be referred to as an apoxy silicate product.

Epoxy silicate solid and foam products have been produced by the process illustrated in U.S. Pat. Nos. 4,036,787; 4,086,190 and 4,087,407, by utilizing an epoxy compound, an amine compound and an inorganic oxidated silicon compound. In the process of U.S. Pat. No. 4,087,407, the epoxy silicate foam is produced by heating the epoxy-amine-silicate polymer. A "gas" is produced and expands and cures the epoxy-amine-silicate foam. In the process of this invention, no amine compound is utilized. The foam is produced by the release of oxygen from the peroxide which oxidizes which also oxidated silicon, and initiates the reaction between the epihalohydrin compound and the alkali oxidated silicon compound. The epoxy silicate product produced by this invention is less expensive and is an improved product.

DESCRIPTION OF THE INVENTION

Epoxy silicate solid and foam products are produced by the chemical reaction of an alkali, oxidized silicon compound, an epihalohydrin or any alpha-chloro-beta, gamma-epoxy organic compound and a free-radical initiator, e.g., organic and inorganic peroxide.

The reactants may be mixed in any suitable proportions, depending upon the product characteristics desired. The reactants may be added in any suitable method such as mixing all reactants simultaneously or mixing the alkali oxidized silicon compound epihalohydrin compound, then adding the peroxide compound or mixing the alkali oxidized silicon compound and peroxide compound, then adding the epihalohydrin compound. The reactions of the invention may take place under any suitable physical condition. While many of the reactions will take place acceptably at ambient temperatures and pressures, preferably, the reaction takes place at a temperature between 20° and 100° C. On the other hand, where the reaction is exothermic, it may be desirable to cool the reaction vessel.

The preferred process of this invention is to add the reactants simultaneously and thoroughly mix at ambient pressure and temperature. The reaction is exothermic and in large volumes, it will be necessary to cool the reaction vessel.

The exact course of the reactions which take place during the process to produce epoxy silicate solid and foam products cannot be determined with 100 percent certainty. The exact chemical formula for the epoxy silicate product is not known. The peroxide compound enhances the reaction of the epihalohydrin with the alkali oxidated silicon compound by oxidizing the alkali oxidized silicon compound and initiating the reaction of the epoxy radical and halogen radical with the alkali oxidated silicon compound.

A good epoxy silicate product can be produced without reacting all the alkali radical of the alkali oxidated silicon compound with halogen radicals from the epihalohydrin compound. It is preferable to remove sufficient alkali radical from the alkali oxidated silicon compound to make the epoxy silicate product not soluble in water.

Epoxy silicate solid and cellular products are produced by mixing the following components:
A. Epihalohydrin.
B. Alkali oxidated silicon compound.
C. Free-radical initiator.

COMPONENT A

Any polyfunctional organic compound which contains an epoxy radical and another radical which will react with the alkali radical and the silicate radical of the alkali oxidated silicate compound may be utilized in this invention.

Epihalohydrins or any alpha-chloro-beta, gamma epoxy organic compounds, e.g., epichlorohydrin, may be used in this invention.

Any suitable epihalohydrin in compound may be used in this invention, such as epichlorohydrin, epibromohydrin, methyl epichlorohydrin, di-epi-iodohydrin and mixtures thereof. Epichlorohydrin is the preferred epihalohydrin.

Instead of epichlorohydrin, other compounds of the following general formula:

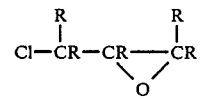

where R is the same or different organic radicals or hydrogen. Preferably, the R groups contain no strong acidic groups such as sulphonic acid groups, but any organic radicals may be used since the R groups are not important. It is important that the chloro and epoxy groups be in the position indicated. The R groups may, for example, by $CH_3-$, $C_2H_5-$, $C_3H_7-$, $C_5H_4-$, $C_8H_{17}-$, $C_{10}H_{21}-$, phenyl, benzyl, tolyl, xylyl, pyridyl, furyl, etc., may be used in this invention.

Among these some examples are:

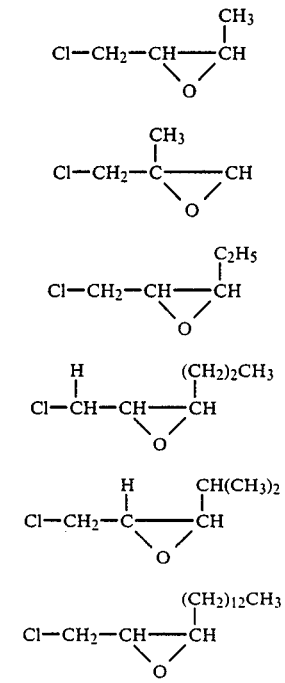

-continued

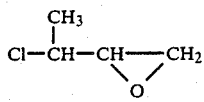

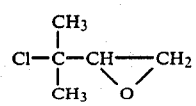

COMPONENT B

Any suitable alkali oxidized silicon compound may be used in this invention such as alkali metal silicates, alkaline earth metal silicates, zeolites and water-binding silicate compounds which contain an alkali metal or alkaline earth metal radical.

Suitable alkali metal silicates include sodium silicate, potassium silicate, lithium silicate and mixtures thereof. Sodium silicate is the preferred alkali metal silicate.

Suitable alkaline earth metal silicates include calcium silicate. The preferred form of calcium silicate is the synthetic calcium silicate.

Suitable water-binding silicate compounds which contain an alkali metal or alkaline earth metal radical, including any mixture of fine ground lime, alumina and silica that will set to a hard product by the admixture of water, which combines chemically with the other ingredients to form a hydrate, may be used. Suitable water-binding silicates include hydraulic cements such as Portland cement, quick-setting cement, blast-furnace Portland cement, mild burnt cement, sulphate-resistant cement, brick cement, natural cement, lime cement, gypsum cement and pozzolano cement, and mixtures thereof.

The preferred alkali oxidated silicon compound is sodium silicate. Sodium silicate may be utilized in the form of a powder or in an aqueous solution. The $SiO_2$:-$NaO$ ratio may be quite varied, but is preferred to range from 4.0:1 to 1:1. The sodium silicate solutions may contain silica sol, colloidal silica and mixtures thereof.

COMPONENT C

Any suitable free-radical initiator which will promote the chemical reaction of an alkali oxidated silicon compound with an epihalohydrin compound to produce an epoxy silicate polymer may be used in this invention. Suitable free-radical initiators are inorganic and organic peroxides, alkali metal persulfates and mixtures thereof. The free-radical initiator can be modified by activators and promoters. Initiators are strong oxidizing agents and promoters that usually are strong reducing agents. Redox systems may also be utilized in this invention. The activators and promoters vary with each free radical initiator and are well known in the chemical arts. The organic peroxides are well known in the chemical art.

The preferred free-radical initiator is hydrogen peroxide. The aqueous solution of hydrogen peroxide is preferred.

Any suitable organic or inorganic compound that will react chemically with alkali oxidated silicon compound or the epihalohydrin may be used to modify the epoxy silicate products. Compounds which are polymerized by free-radical initiators may be used to modify the epoxy silicate products.

Any suitable modifying or additive compounds may be used in the reaction of this invention to vary properties of the product. Typical modifying compounds included polyols, polyepoxides, polysulfide polymers, alkali sulfides, sodium polysulfides, aminoplasts, phenoplasts, fatty or rosin acids, furfural-ketone resins, styrene oxides, carbon disulfide, sulfur, wood flour, wood fibers, cellulose, lignin, polyester polymers, polyether polymers, vegetable oil, melamine, furan compounds, vinyl monomers and polymers, aliphatic dienes, halogenated aliphatic and aromatic compounds, triallyl cyanurate, polyepichlorohydrin polymers, alkali metal phenols, alkali metal salts of dicarboxyl acids, alkali metal polyhydroxy aliphatic and aromatic compounds, alkali metal salts of poly(acrylic acid)polymers and poly(methacrylic acid)polymer, aldehydes and mixtures thereof.

Suitable polyols are, but are not limited to, polyhydroxyl compounds of polyesters, polyethers, polythioesters, polyacetals, polycarbonates, polyamides or polybutadiene; castor oil, carbohydrates, starches, additional products of alkaline oxides with phenoformaldehyde resins or urea-formaldehyde resins di(monohydroxy)alkane, glycerol, bisphenol A, diglycidyl ether of bisphenol, resorcinol, hydroquinoneglycols, polyvinyl alcohol and mixtures thereof.

Various additives, fillers, organic and inorganic foam stabilizers, emulsifiers, flame-retarding agents, plasticizers, stabilizers against aging and weathering, fungicidal and bacteriocidal substances, dyes, cell regulators, and blowing agents may be added to the epihalohydrin, alkali oxidated silicon compound and free-radical initiator mixture.

Additives may be added to emulsify the mixture, to modify the cells in the cellular solid, to regulate the foaming and to stabilize the cellular solid. The mixture may be emulsified with alkali soaps, metallic soaps such as zinc stearate and calcium stearates and detergents. The cells in the cellular solid may be modified, regulated and stabilized by the addition of additives such as metallic powders, ethyl cellulose, chlorinated natural rubber, polyvinyl acetate, polyvinyl chlorides, metallic salts, metallic oxides and hydroxides, alkylated phenoxy compounds, polyethoxy ethanol, sodium dioctyl sulfosuccinate, dioctyl calcium sulfosuccinate, dioctyl sulfosuccinate, methyl morpholine, diethylethanolamine, polyether, polyether siloxanes, and mixtures thereof.

Water-binding agents which do not contain silicate, e.g., calcium aluminate, may be used to react with any excess water present.

Any suitable polyepoxy compound may be used in this invention. Suitable polyepoxy compounds include, but are not limited to, epoxidized polyhydroxy compounds, epoxidized oils, epoxidized unsaturated organic compounds, epoxidized unsaturated fatty acids, phenoxy resins, polyepoxy resin produced by reacting epichlorohydrin with bisphenol A[2,2-(4-bishydroxy phenol)-propane]; diglycidil ether of bisphenol; 1,2-epoxy butane; 1,2-epoxycyclohexane; 1,2-epoxypropane; 1-chloro-2,3-epoxypropane; and mixtures thereof.

Any suitable organic compound that will slowly react with the alkali radical of the alkali oxidated silicon compound to form a salt with any excess alkali radical present in the reactive mixture of this invention may be used.

Suitable compounds such as silicic acid, polysilic acid, metal salts, amorphous silica, colloidal silica, boric acid, etc., may be used in this invention.

Suitable organic compounds such as organic esters, phosphate polyols, carbon dioxide, weak organic acids and mixtures thereof may be used in this invention.

Various reinforcing agents may be used in this invention. The inorganic and/or organic reinforcing elements may be, e.g., fibers, metal wires, foams, fabrics, fleeces or skeletons. The reinforcing elements may be mixed with the reaction mixture, for example, by the fibrous web impregnation or by processes in which the reaction mixtures and reinforcing fibers are together applied to the molds, for example, by means of a spray apparatus. The shaped products obtained in this way may be used as building elements, e.g., in the form of sandwich elements, either as such or after they have been laminated with metal, glass, plastics, wood or concrete. If desired, these sandwich elements may be foamed. These products may be used as hollow bodies, e.g., as containers for goods which may be required to be moist or cool, as filter materials or exchanges, as catalyst carriers or as carriers of active substances, as decorative elements, furniture components and filling for cavities. They may be used in the field of model building and mold building, and in the production of molds for metal casting, which may also be considered.

Fillers in the form of powders, granules, wire, fibers, dumbbell-shaped particles, crystalites, spirals, rods, beads hollow beads, foam particles, non-woven webs, pieces of woven or knitted fabrics, tapes and pieces of foil or solid inorganic or organic substances, e.g., dolomite, chalk, alumina, asbestos, basic silicic acids, sand, talc, iron oxide, aluminum oxide and hydroxide, calcium sulfates, alumino silicates, basalt wool or powder, glass fibers, carbon fibers, graphite, carbon black, Al, Fe, Cu and Ag powders, molybdenum sulfide, steel wool, bronze or copper meshes, silicon powder, expanded clay particles, hollow glass beads, glass powder, lava and pumice particles, wood chips, wood meal, cork, cotton, straw, popcorn, coke or particles of filled or unfilled foamed or unfoamed, stretched or unstretched organic polymers, may be added to the mixture of the components in many applications. Among the numerous organic polymers which may be used, e.g., as powders, granules, foam particles, beads, hollow beads, foamable but not-yet-foamed particles, fibers, tapes, woven fabrics or fleeces, the following may be mentioned as examples: polystyrene, polyethylene, polypropylene, polyacrylonitrite, polybutadiene, polyisoprene, polytetrafluoroethylene, aliphatic and aromatic polyesters, melamine, phenoplasts, aminoplasts, polyacetal resins, polyepoxides, polyhydantoins, polyethers, polyurethane, polyimides, polyamides, polysulphones, polycarbonates and carbonates and mixtures thereof.

The composite materials of the invention may be mixed with considerable quantities of fillers without losing their advantageous properties and, in particular, composite materials which consist predominantly of organic constituents which are, preferably, filled with inorganic fillers, where silicate constituents predominate, it is preferably filled with organic fillers.

Blowing agents may be used in this invention. The blowing agents are usually inert liquids with boiling points ranging from $-25°$ to $80°$ C. The organic blowing agents may be, e.g., acetone, ethyl acetate, halogenated alkanes, e.g., methylene chloride, monofluorotrichloromethane, dichlorodifluoromethane, butane, hexane, heptane or diethylether. There are compounds which decompose at temperatures above room temperature with liberation of e.g., nitrogen. Compressed air may also be used as the blowing agent.

The ratio of the essential reactants and optional reactants which lead to the epoxy silicate solid or foamed product of this invention may vary, broadly speaking, with ranges as follows:

(a) 1 to 100 parts by weight of Compound A (Epihalohydrin or other alpha-chloro-beta, gamma-epoxy organic compounds).

(b) 100 parts by weight of Component B (alkali oxidated silicon compounds).

(c) 0.1 to 10 parts by weight of Component C (Free-radical initiator).

(d) Up to 300% by weight of water, based on the weight of Components A, B and C.

(e) Up to 20% by weight of a foam stabilizer, based on weight of Components A, B and C.

(f) Up to 50% by weight of a chemically insert blowing agent, boiling within the range of from $-25°$ C. to $80°$ C., based on weight of Components A, B and C.

(g) Up to 10% by weight of an emulsifier, based on weight of Components A, B and C.

(h) Up to 300% by weight of an inert filler material, based on the weight of Components A, B and C.

(i) Up to 300% by weight of modifying compounds, based on the weight of Compound A.

(j) Up to 10% by weight of a promoter of the free-radical initiator, based on weight of Component C.

(k) Up to 10% by weight of an activator for the free-radical initiator, based on weight of Component C.

The novel cellular and solid products produced by this invention have many uses. The reaction mixtures, with or without a blowing agent, may be mixed in a mixing apparatus; then the reaction mixture (alkali oxidated silicon compound, epihalohydrin and the free-radical, hydrogen peroxide) may be sprayed by means of compressed air or by the airless spraying process onto surfaces. Subsequently, the mixture expands and hardens in the form of a cellular solid which is useful for insulation, cavity filling and coating. The reaction mixture may also be forced, poured or injected into cold or heated molds, optionally by centrifugal casting, and left to harden at room temperature or at temperatures up to $100°$ C., optionally under pressure. Reinforcing elements may quite easily be incorporated into the reaction mixtures. These products may also be used as cavity fillings, packing materials, building materials, e.g., lightweight building bricks and panels, having a good solvent resistance, advantageous fire-resistant characteristics, good strength, high dimensional stability to heat and cold, and good sound absorption capacity. The cellular products of this invention may be foamed on the building site, using any hollow forms for foaming. The foams may be crushed and used for propagation of seedlings, cuttings and plants or cut flowers after washing out any salt.

The reaction mixture of this invention may be used aa a solid product by allowing any gas produced by the free-radical initiator to escape from the mixture before the reaction mixture solidifies. The fluid reactive mixture, with the gas removed by stirring vacuum, may be poured or sprayed or injected into a mold. Subsequently, the mixture hardens. Reinforcing agents and filler may quite easily be incorporated into the reaction mixture. These products may be used as cavity fillers, building panels, building bricks, grout, mortor, and in many cases, can be used in place of wood or hard fiber boards, as art objects, moldings, decorating elements, furniture components, surface coating, adhesive bonds, putties, etc.

The object of the present invention is to provide a novel process to produce epoxy silicate solid or cellular solid products. Another object is to produce novel solid and cellular epoxy silicate products. Another object is to produce novel cellular and solid epoxy silicates which are relatively low in cost. Still another object is to produce novel fine cellular products which are relatively low in cost, are rigid, light-weight, high-strength, fire resistant, with good resistance and dimentional stability when heated, and are solvent-resistant.

Another object is to produce solid or cellular products which may be used for thermal or sound insulation, structural purposes, shock-resistant packaging, as a coating agent, adhesive, casting material, cavity fillers, mortor, etc.

DESCRIPTION OF PREFERRED EMBODIMENTS

My invention will be illustrated in greater detail by the specific Examples which follow, it being understood that these preferred embodiments are illustrative of, but not limited, to procedures which may be used in the production of epoxy silicate products. Parts and percentages are by weight unless otherwise indicated.

EXAMPLE 1

5 parts by weight of epichlorohydrin, 30 parts by weight of an aqueous sodium silicate containing about 40% sodium silicate ($SiO_2$:NaO, ratio 3.2:1) and 2 parts by weight of an aqueous solution containing 35% hydrogen peroxide are mixed at ambient temperature and pressure, then poured into a container. The mixture slowly thickens in 10 to 20 minutes. Then the mixture begins to expand and the temperature of the rises. The mixture solidifies within 30 to 40 minutes to produce a rigid, strong cellular solid product. A product of open and closed cells is produced. The mixture expands to about 3 times the original volume. The foam is air-dried to remove excess water.

EXAMPLE 2

1 part by weight of epichlorohydrin, 10 parts by weight of an aqueous sodium silicate solution containing about 40% sodium silicate ($SiO_2$:NaO, ratio of 3.22:1), 0.5 part by weight of an aqueous solution containing 35% hydrogen peroxide, 0.5 part by weight of doctyl sodium sulfosuccinate, 0.25 part by weight of polyether siloxane foam regulator are thoroughly mixed, then poured into a container. The mixture slowly thickens over a 10 to 20 minute period, then slowly expands to about 2 times its original volume, then solidifies into a rigid cellular solid product. The cellular product air dries into a strong, light-weight foamed product. A dry one-inch cube will withstand more than 200 pounds of weight without compressing.

EXAMPLE 3

3 parts by weight of epichlorohydrin, 30 parts by weight of an aqueous sodium silicate solution containing about 45% sodium silicate ($SiO_2$:$NaO_2$, ratio of 3.22:1), 2 parts by weight of an aqueous solution containing 35% hydrogen peroxide, 0.5 part by weight of an alkyl phenoxy polyethoxy ethanol (Triton×100 by Rohm) and 0.25 part by weight of a polyethersiloxane foam regulator (Dow Corning 193 Surfactant) are thoroughly mixed in a container. The mixture slowly thickens over a 10 to 20 minute period, then slowly expands to about 4 times its original volume, then solidifies into a strong, rigid cellular product. The cellular product is air-dried. The light-weight strong, rigid cellular product was tested for compression strength and withstood 325 psi. The product does not support a flame on being heated with a propane torch.

EXAMPLE 4

Example 3 is modified by using other alkali metal silicate in place of sodium silicate, such as potassium silicate and lithium silicate, to produce epoxy silicate cellular products.

EXAMPLE 5

2 parts by weight of epichlorohydrin, 3 parts by weight of white Portland cement, 15 parts by weight of water, 1.5 part by weight of an aqueous solution containing 35% hydrogen peroxide and 0.3 part by weight of a polyether siloxane foam regulator are added to a container, then thoroughly mixed. In a few minutes the mixture begins to expand and then slowly solidifies in about 1 hour to produce a rigid cellular solid product. The foam cures into a strong, light-weight epoxy silicate concrete product.

EXAMPLE 6

Example 5 is modified by adding 5 parts by weight of calcium silicate, 3 parts by weight of trichlorofluoromethane and 1 parts by weight of lignin to the components. A strong, rigid cellular solid is produced.

EXAMPLE 7

10 parts by weight of epichlorohydrin, 30 parts by weight of an aqueous solution of sodium silicate containing about 40% sodium silicate ($SiO_2$:NaO, ratio of 3.2:1) and 2 parts by weight of an aqueous solution containing 35% hydrogen peroxide are mixed to a container. The mixture slowly thickens, then begins to expand. The mixture expands to about double its original volume, then solidifies to produce a cellular product. A 1-inch cube of the cellular product was tested, after air-drying for one week, by adding 200 pounds of weight on the cube before it began to be compressed. The cellular product will not support a flame.

EXAMPLE 8

Example 7 is modified by adding 3 parts by weight of a polyol, selected from the list below, thereby producing a cellular epoxy silicate product:
(a) glycerol,
(b) polypropylene triol (OH number 56),
(c) polypropylene triol (OH number 28),
(d) polyethylene diol,
(e) BISPHENOL-A,
(f) resorcinol neutralized sodium silicate,
(g) hydroquinone glycol,
(h) phenol-formaldehyde resin with free OH groups and neutralized with sodium silicate,
(i) sucrose,
(j) dextrose.

EXAMPLE 9

Example 7 is modified by using another epihalohydrin in place of epichlorohydrin and selected from the group consisting of epibromohydrin, methyl epichlorohydrin and di-epiodohydrin.

EXAMPLE 10

Example 7 is modified by adding 5 parts by weight of a modifying compound selected from the group listed below and added with the other components:
- (a) sodium polysulfide,
- (b) aminoplast,
- (c) phenoplast,
- (d) furfural-ketone resin,
- (e) wood flour,
- (f) wood fibers,
- (g) styrene oxide,
- (h) cellulose,
- (i) lignin,
- (j) polyester resin,
- (k) melamine,
- (l) styrene,
- (m) sodium salt of adipic acid,
- (n) sodium salt of poly(acrylic acid),
- (o) sodium salt of poly(methacrylic acid),
- (p) vegetable oil,
- (q) vinyl acetate polymer in an aqueous solution,
- (r) sodium salt of polyester polymer,
- (s) sodium sulfite,
- (t) polyepoxy resin.

EXAMPLE 11

30 parts by weight of synthetic calcium silicate powder, 3 parts by weight of epichlorohydrin, 10 parts by weight of water, 1 part by weight of an aqueous solution containing 35% hydrogen peroxide and 0.5 part by weight of a polyethersiloxane foam regulator and mixed in a container. The mixture expands to about 4 times its original volume, then solidifies to form a rigid cellular product.

EXAMPLE 12

5 parts by weight of epichlorohydrin, 10 parts by weight of sodium silicate powder ($SiO_2$:NaO, ratio of 3.2:1) and 2 parts by weight of an aqueous solution containing 35% hydrogen peroxide are rapidly and thoroughly mixed. The reaction starts in a few seconds and a solid epoxy silicate compound is produced.

EXAMPLE 13

Example 12 is modified by adding another alkali oxidized silicon compound in place of sodium silicate which is selected from the following list:
- (a) potassium silicate ($SiO_2$:KO, ratio of 2:1),
- (b) synthetic calcium silicate,
- (c) Portland cement,
- (d) sodium silicate powder ($SiO_2$:NaO, ratio of 3.75:1),
- (e) sodium silicate powder ($SiO_2$:NaO, ratio of 2:1),
- (f) sodium polysilicate powder (GA produced by PQ Corp.),
- (g) zeolite powder,
- (h) mixtures of the above.

EXAMPLE 14

3 parts by weight of epichlorohydrin, 30 parts by weight of an aqueous solution of sodium silicate containing about 40% sodium silicate ($SiO_2$:NaO, ratio of 3.2:1), 0.5 part by weight of methyl ethyl ketone peroxide, 0.05 part by weight of cobalt naphthenate and 0.25 part by weight of a polyethersiloxane foam-regulator are added to a container and thoroughly mixed. The mixture is heated to about 60° C. and the mixture slowly expands, then solidifies, thereby producing a rigid cellular epoxy silicate powder.

EXAMPLE 15

3 parts by weight of epichlorohydrin, 30 parts by weight of an aqueous solution of sodium silicate containing about 40% sodium silicate ($SiO_2$:NaO, ratio of 3.2:1), 0.5 part by weight of diethyl aniline and 0.25 part by weight of benzoyl peroxide are added to a container and thoroughly mixed. The mixture is heated to 60° C. and the mixture slowly thickens and then solidifies to produce a solid epoxy silicate product.

EXAMPLE 16

Example 15 is modified by using an alkali metal persulfate in place of the benzoyl peroxide which is selected from the following:
- (a) potassium persulfate,
- (b) sodium persulfate.

EXAMPLE 17

3 parts by weight of epichlorohydrin, 30 parts by weight of an aqueous solution of sodium silicate containing about 30% sodium silicate ($SiO_2$:NaO, ratio of 3.22:1), 2 parts by weight of an aqueous solution containing 35% hydrogen peroxide and 10 parts by weight of a fine expanded perlite are mixed thoroughly, then poured into a mold. The mixture slowly thickens and then slowly expands, then solidifies into a cellular solid product. The product dries into a strong, cellular, lightweight epoxy silicate product.

EXAMPLE 18

Example 17 is modified by using other light-weight aggragates, listed below:
- (a) expanded crystalin silica (Q-cel 120 produced by PQ Corp.),
- (b) fine expanded clay,
- (c) fine expanded silicate (Q-cel 300 produced by PQ Corp.),
- (d) fine expanded vermiculite.

Although specific conditions and ingredients have been descroved in conjunction with the above examples of preferred embodiments, these may be varied and other reagents and additives may be used, where suitable, as described above, with similar results.

Other modifications and applications of this invention will occur to those skilled in the art upon reading this disclosure. These are intended to be included within the scope of this invention as defined in the appended claims.

I claim:

1. The epoxy silicate product produced by mixing and reacting of the following components:
   - (A) epihalohydrin, 1 to 100 parts by weight,
   - (B) an alkali oxidated silicon compound selected from the group consisting of alkali metal silicates, alkaline earth metal silicates, water-binding silicate compounds containing an alkaline earth metal radical and mixtures thereof, 100 parts by weight,
   - (c) a free-radical initiator selected from the group consisting of organic peroxides, inorganic peroxides, alkali metal persulfates and mixtures thereof, 0.1 to 10 parts by weight, then allowing any blowing agent to escape thereby producing a solid product.

2. The process of claim 1 wherein the epihalohydrin is selected from the group consisting of epichlorohydrin, methyl epichlorohydrin, epibromohydrin and mixtures thereof.

3. The process of claim 1 wherein up to 300 percent by weight of water, based on the weight of Components A, B and C, is added to the Components.

4. The process of claim 1 wherein up to 10 percent by weight of an emulsifier, based on the weight of Components A, B and C, is added to the Components.

5. The process of claim 1 wherein up to 300 percent by weight of inert filler material, based on the weight of Components A, B and C, is added to the Components.

6. The process of claim 1 wherein up to 300 percent by weight of a modifying compound, based on the weight of Component A, B and C, is added to the components.

7. The product produced by the process of claim 6.

8. The epoxy silicate product produced by mixing and reacting the following components:
  (a) 1 to 100 parts by weight of of epichlorohydrin,
  (b) 100 parts by weight of sodium silicate in an aqueous solution,
  (c) 0.1 to 10 parts by weight of hydrogen peroxide in an aqueous solution,
then allowing any blowing agent to excape thereby producing a solid product.

9. The epoxy silicate product produced by mixing and reacting the following components:
  (a) 1 to 100 parts by weight of epichlorohydrin,
  (b) 100 parts by weight of sodium silicate in an aqueous solution,
  (c) 0.1 to 10 parts by weight of hydrogen peroxide in an aqueous solution,
  (d) up to 10 percent by weight of an emulsifier, based on the weight of components A, B and C,
then allowing any blowing agent produced in the reaction to escape thereby producing an aqueous suspension of a solid product.

10. The epoxy silicate product produced by mixing and reacting the following components:
  (a) 1 to 100 parts by weight of epichlorohydrin,
  (b) 100 parts by weight of hydraulic cement,
  (c) up to 300 percent by weight of water, based on the weight of components A, B and C,
  (d) 0.1 to 10 parts by weight of hydrogen peroxide in an aqueous solution,
  (e) up to 10 percent by weight of an emulsifier, based on the weight of component A, B and C,
then allowing any blowing agent produced in the reaction to escape thereby producing a solid product.

11. The epoxy silicate product produced by mixing and reacting the following components:
  (a) 1 to 100 parts by weight of epichlorohydrin,
  (b) 100 parts by weight of sodium silicate in an aqueous solution,
  (c) 0.1 to 10 parts by weight of hydrogen peroxide in an aqueous solution,
  (d) up to 10 percent by weight of an emulsifier, based on the weight of components A, B and C,
  (e) up to 300 percent by weight of polyol, based on the weight of component A,
then allowing any blowing agent produced in the reaction to escape thereby producing a solid product.

12. The process of claim 1 wherein up to 300 percent by weight of a polyol, based on weight of Component A of claim 1, is added to the Components.

13. The products produced by the process of claim 12.

14. The epoxy silicate product produced by mixing and reacting the following components:
  (a) 1 to 100 parts by weight of epichlorohydrin,
  (b) 100 parts by weight of sodium silicate in an aqueous solution,
  (c) 0.1 to 10 parts by weight of hydrogen peroxide in an aqueous solution,
  (d) up to 300 percent by weight of a polyepoxy compound, based on the weight of Compound A,
then allowing any blowing agent produced in the reaction to escape thereby producing a solid product.

15. The process of claim 1 wherein up to 300 percent by weight of a polyepoxy compound, based on the weight of Compound A, is added to Components A, B, and C of claim 1.

16. The product produced by the process of claim 15.

17. The process of claim 1 wherein up to 10 percent by weight of an activator for the free-radical initiator, based on the weight of Component C, is added to the components of claim 1.

* * * * *